2 Sheets—Sheet 1
G. W. VERONEE.
ROCK CATCHER.
No. 11,293.
Reissued Dec. 6, 1892.
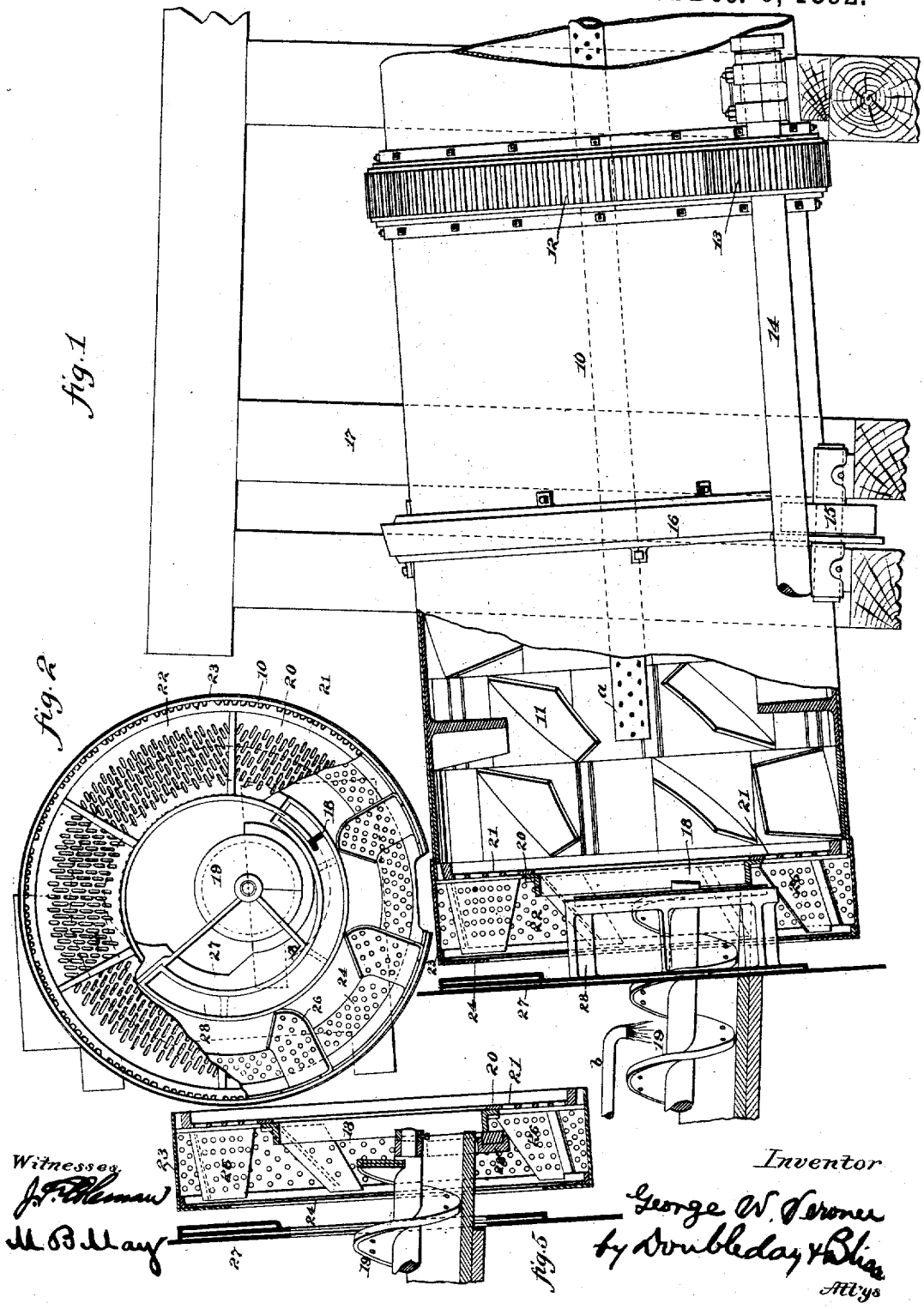
Witnesses.
J. F. Bleman
H. B. Mary
Inventor
George W. Veronee
by Doubleday & Bliss
Att'ys
THE NORRIS PETERS CO., PHOTO-LITHO., WASHINGTON, D. C.

2 Sheets—Sheet 2.

G. W. VERONEE.

ROCK CATCHER.

No. 11,293. Reissued Dec. 6, 1892.

Witnesses.

J. F. Ohlman

M. B. May

Inventor

George W. Veronee by Doubleday & Bliss

Att'ys.

THE NORRIS PETERS CO., PHOTO-LITHO., WASHINGTON, D. C.

UNITED STATES PATENT OFFICE.

GEORGE W. VERONEE, OF TEN MILE HILL, SOUTH CAROLINA.

ROCK-CATCHER.

SPECIFICATION forming part of Reissued Letters Patent No. 11,293, dated December 6, 1892.

Original No. 471,041, dated March 15, 1892. Application for reissue filed August 30, 1892. Serial No. 444,588.

*To all whom it may concern:*

Be it known that I, GEORGE W. VERONEE, of Ten Mile Hill, in the county of Berkeley and State of South Carolina, have invented certain new and useful Improvements in Rock-Catchers; and I do hereby declare the following is a full, clear, and exact description of the invention, that will enable others skilled in the art to which it appertains to make and use the same, reference being had to the accompanying drawings, and to the letters and figures of reference marked thereon, which form a part of this specification.

My invention relates to improvements in rock-catchers adapted to be used with the common cylinder-washers which are employed to wash and clean phosphate rock and ores of various kinds; and the object is to produce a simple and efficient rock-catcher which may be secured to any of the cylinder-washers and which will cause the mud, fine rock, and trash to be quickly separated and will deliver the rock, if desired, to the washer.

To this end my invention consists in certain features of construction and combinations of parts, which will be hereinafter described and claimed.

Reference is to be had to the accompanying drawings, forming a part of this specification, in which similar figures of reference indicate corresponding parts in all the views.

Figure 4:
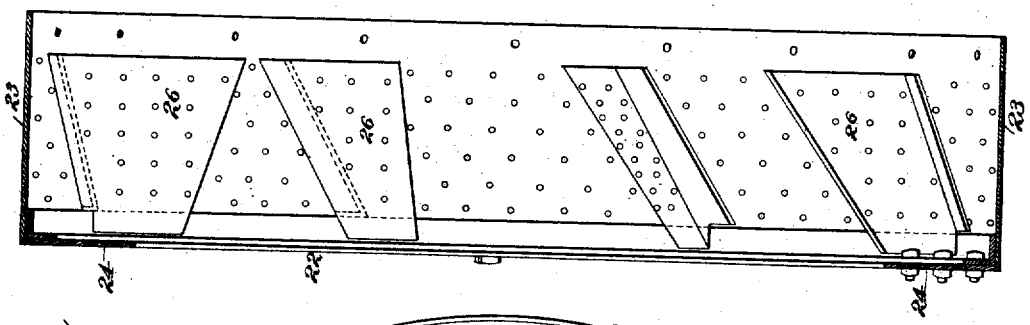
Figure 3:
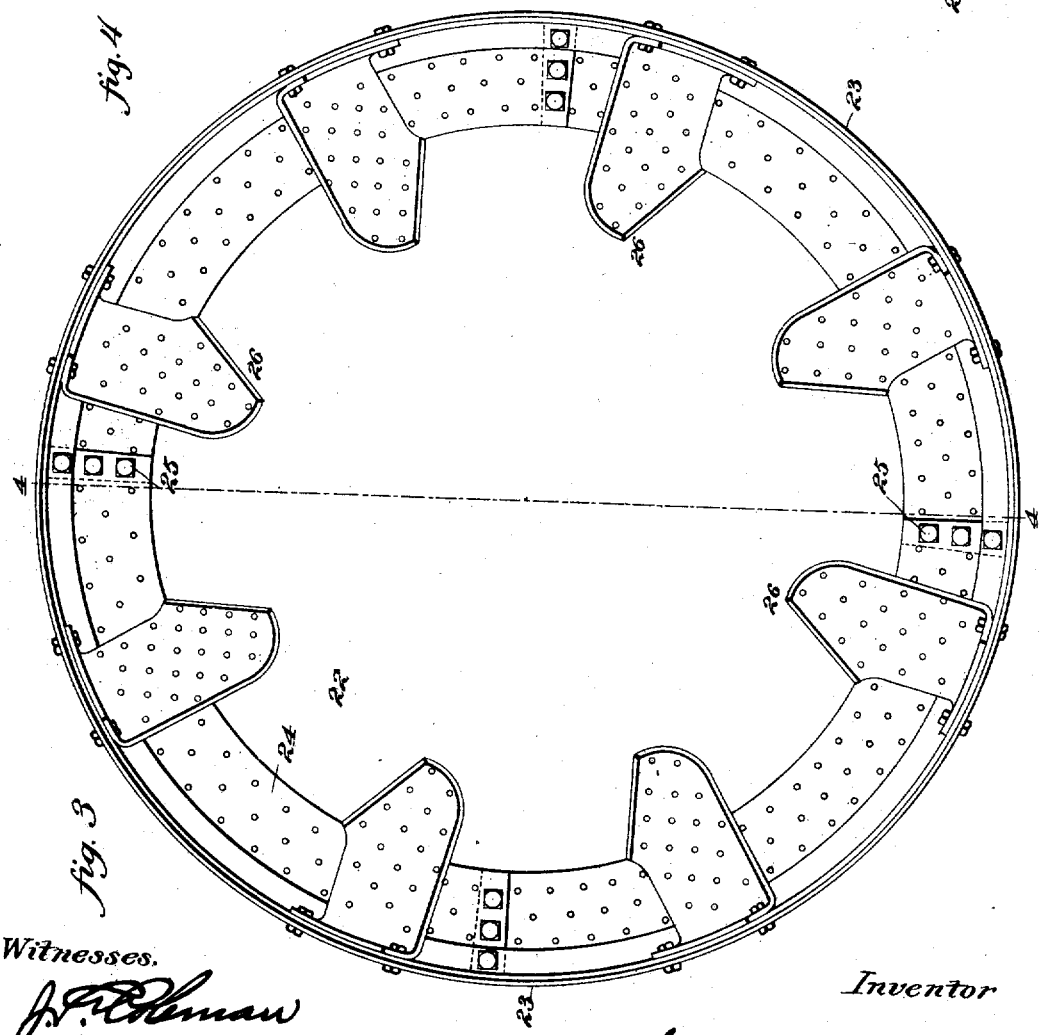

Figure 1 is a broken side elevation, partly in vertical section, of my rock-catcher, showing it applied to a cylinder-washer. Fig. 2 is a broken inside view of the cylinder and rock-catcher. Fig. 3 is an enlarged inside end view of the rock catcher, and Fig. 4 is a cross-section on the line 4 4 in Fig. 3.

The cylinder-washer 10 is of a common form, having the inside flanges 11, which are adapted to carry the material in the washer toward the upper end of the cylinder, and the cylinder is provided with a gear 12, which is secured to its outer surface and which meshes with a pinion 13 on the driving-shaft 14. The cylinder is inclined in the usual way, and it also rests upon a friction-roller 15, which engages a roll 16 on the cylinder, and the whole is supported in a framework 17. In the lower end of the cylinder is an opening through the ring 18, and a screw 19 is arranged to feed the cylinder with the material to be washed. The above construction is of the common form and I claim no part of it as my invention.

At the lower end of the main cylinder 10 is an end plate 20, which fills the entire end of the cylinder between the shell of the cylinder and the ring 18, and this plate is perforated, as shown at 21, so that the mud and waste material will flow through it. The rock-catcher 22 is also of a cylindrical form, and it is secured to the lower end of the cylinder 10, as best shown in Fig. 2. It is provided with an outer shell 23, which is perforated, so that the finer particles may run to waste through it, and it has an end flange 24, which is comparatively narrow and which is perforated so that the mud and fine particles of rock may run to waste through it, and the chips and such material as will float will rise on the water and flow off over the edge of the flange.

The catcher 22 is made in two parts, which are united by bolts, as shown at 25, and which enable it to be easily adjusted upon the washer. Bolted to the shell of the catcher are inwardly-extending curved flanges or lifting-buckets 26, which are perforated, so that the waste material will run through them, and these flanges are adapted to scoop up the material in the bottom of the catcher and drop it upon the screw 19, so that it will be delivered to the washer, and as the waste material is constantly running through the perforations in the flanges and in the walls of the catcher and over the edge of the catcher-flange it will be seen that the material delivered to the screw and carried into the washer will be comparatively-clean rock, so that by using the catcher the rapid washing of the rock is greatly facilitated and there is great saving of valuable material.

Below the catcher and surrounding the screw is a back plate 27, which may be secured to any convenient support, and this forms an abutment for the open framework 28, which is mounted on the screw between the back plate and the ring 18 of the washer, and the back plate will thus serve as an abutment to receive the thrust of the washer.

It will be understood that in using the washer and rock-catcher a plentiful supply of water is allowed to run into the same, and I prefer to supply the water by a perforated pipe *a*, projecting into the cylinder, and by means of a pipe *b*, which delivers water to the feed-screw. From the foregoing description it will be seen that the washer will be supplied with comparatively-clean rock from the catcher.

Having thus described my invention, I claim as new and desire to secure by Letters Patent—

1. The combination, with the cylindrical washer and its feed-screw, of a cylindrical catcher secured to the feed end of the washer, said catcher having a perforated end flange and having curved flanges extending inward from its shell, substantially as described.

2. The combination, with the washer-cylinder and its feed-screw, of a perforated plate secured at the free end of the washer and provided with a central opening to receive material from the screw, and a cylindrical catcher secured to the end of the washer, said catcher having an end flange and having inwardly-extending curved and perforated flanges, substantially as described.

3. The combination, with the washer and its feed-screw, of the perforated cylindrical catcher secured to the lower end of the washer, said catcher having a perforated end flange and having inwardly-projecting curved and perforated flanges arranged to deliver upon the feed-screw, substantially as described.

4. The combination, with the washer-cylinder, of an abutment-plate supported at the lower end of the cylinder and a framework arranged between the abutment-plate and the cylinder-head, substantially as described.

5. The combination of the main washer, water-supplying devices, a screen at the feed end of the washer, a rotary catcher at said feed end receiving the material from the said screen, said catcher having screening mechanism, and mechanism for delivering from the catcher to the main washer, substantially as set forth.

6. The combination, with the main rotary washer having a perforated screen-plate at the feed end, through which water and solid materials can pass by backflow from the washer, of the rotary catcher situated to receive the backflowing materials from the main washer and having screen-like walls and lifting devices for depositing one or more of the solid materials in a conveyer, substantially as set forth.

7. The combination, with the main rotary washer, of a screen at the feed end, through which screen water and other material can pass by backflow from the washer, and a rotary catcher supplemental to the main washer and situated to receive the backflowing material, and means for lifting a portion of said material from the catcher and redelivering it to the main washer, substantially as set forth.

8. The combination of the main washer having at the feed end a screen with relatively-large passages, a catcher supplemental to the washer, having a screen with relatively-small passages, and water-supplying devices for the main washer, substantially as set forth.

In testimony whereof I affix my signature in presence of two witnesses.

GEORGE W. VERONEE.

Witnesses:
G. M. SUNHOLM,
JOHN B. WHITE.